US011629603B2

(12) United States Patent
Jasper et al.

(10) Patent No.: US 11,629,603 B2
(45) Date of Patent: Apr. 18, 2023

(54) TURBOMACHINE AIRFOIL HAVING A VARIABLE THICKNESS THERMAL BARRIER COATING

(71) Applicant: General Electric Company, Schenectady, NY (US)

(72) Inventors: Martin James Jasper, Simpsonville, SC (US); Jan Agudo, Greenville, SC (US); Melbourne James Myers, Duncan, SC (US); Richard Ryan Pilson, Greenville, SC (US); Christopher W. Kester, Greenville, SC (US)

(73) Assignee: General Electric Company, Schenectady, NY (US)

( * ) Notice: Subject to any disclaimer, the term of this patent is extended or adjusted under 35 U.S.C. 154(b) by 134 days.

(21) Appl. No.: 16/835,492

(22) Filed: Mar. 31, 2020

(65) Prior Publication Data

US 2021/0301670 A1    Sep. 30, 2021

(51) Int. Cl.
*F01D 5/28*    (2006.01)

(52) U.S. Cl.
CPC .......... *F01D 5/288* (2013.01); *F05D 2250/90* (2013.01); *F05D 2260/231* (2013.01); *F05D 2300/611* (2013.01)

(58) Field of Classification Search
CPC ............... F01D 5/288; F05D 2300/611; F05D 2230/91; F05D 2260/95
See application file for complete search history.

(56) References Cited

U.S. PATENT DOCUMENTS

| 5,683,226 A | * | 11/1997 | Clark | F01D 5/288 |
| | | | | 415/200 |
| 6,042,951 A | * | 3/2000 | Kojima | C23C 28/345 |
| | | | | 428/633 |
| 6,511,762 B1 | | 1/2003 | Lee et al. | |
| 6,733,908 B1 | | 5/2004 | Lee et al. | |
| 8,070,454 B1 | * | 12/2011 | Rawlings | F01D 5/288 |
| | | | | 416/241 R |

(Continued)

FOREIGN PATENT DOCUMENTS

| EP | 3456921 A2 | 3/2019 |
| WO | WO2011008211 A1 | 1/2011 |

OTHER PUBLICATIONS

European Patent Office, Search Report for corresponding EP Application No. 21162181.8, dated Aug. 16, 2021.

*Primary Examiner* — Richard A Edgar
*Assistant Examiner* — Michael K. Reitz
(74) *Attorney, Agent, or Firm* — Dority & Manning, P.A.

(57) ABSTRACT

An airfoil includes a root and a tip, which define a span of the airfoil therebetween. The airfoil also includes a leading edge and a trailing edge downstream of the leading edge along a flow direction. The leading edge and the trailing edge each extend across the span of the airfoil from the root to the tip. The airfoil further includes a pressure side surface and a suction side surface. The airfoil also includes a thermal barrier coating on the pressure side surface and the suction side surface. The thermal barrier coating includes a base layer and a top coat. A thickness of the base layer varies across each of the pressure side surface and the suction side surface with a maximum thickness of the base layer at the leading edge.

16 Claims, 9 Drawing Sheets

(56) References Cited

U.S. PATENT DOCUMENTS

| | | | |
|---|---|---|---|
| 8,470,460 B2 | 6/2013 | Lee | |
| 9,567,664 B2* | 2/2017 | Bolz | C23C 14/083 |
| 10,443,411 B2 | 10/2019 | Veitch et al. | |
| 10,689,987 B2 | 6/2020 | Veitch et al. | |
| 10,914,182 B2 | 2/2021 | Bae | |
| 2007/0254181 A1* | 11/2007 | Annigeri | C23C 30/00 |
| | | | 428/678 |
| 2008/0232971 A1* | 9/2008 | Ahmad | F01D 5/288 |
| | | | 416/233 |
| 2011/0033630 A1 | 2/2011 | Naik et al. | |
| 2012/0096714 A1 | 4/2012 | Bishop et al. | |
| 2012/0156049 A1 | 6/2012 | Hong | |
| 2014/0272166 A1* | 9/2014 | Shim | C23C 28/042 |
| | | | 427/448 |
| 2015/0369060 A1* | 12/2015 | Levine | F01D 25/12 |
| | | | 29/889.721 |
| 2016/0108742 A1* | 4/2016 | Papple | F01D 5/288 |
| | | | 416/95 |
| 2019/0128128 A1 | 5/2019 | Bae | |
| 2021/0054749 A1* | 2/2021 | Jackson | F01D 5/284 |

\* cited by examiner

TURBOMACHINE AIRFOIL HAVING A VARIABLE THICKNESS THERMAL BARRIER COATING

FIELD

The present disclosure generally relates to turbomachines. More particularly, the present disclosure relates to airfoils for turbomachines, such as for stator vanes or rotor blades thereof.

BACKGROUND

A gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

The turbine section generally includes a plurality of stator vanes and a corresponding plurality of rotor blades. Each stator vane and each rotor blade include an airfoil positioned within the flow of the combustion gases; thus, the airfoils are referred to as hot gas path components. The airfoils of each stator vane and each rotor blade typically extend radially outward from a platform, such as an inner platform in the case of a stator vane. The airfoil of each stator vane extends to an outer platform at a radially outer end of the stator vane airfoil. The airfoil of each rotor blade extends to a tip at a radially outer end of the rotor blade airfoil. Certain rotor blades may include a tip shroud coupled to the radially outer end of the airfoil. A fillet may be provided at each transition between the airfoil and the platform(s) and/or at the transition between the airfoil and the tip shroud.

The airfoil may extend from a leading edge to a trailing edge downstream of the leading edge and may define aerodynamic surfaces therebetween, such as a pressure side surface and a suction side surface. Because the airfoils are hot gas path components, the surfaces thereof, such as the aerodynamic surfaces, are typically treated to enhance their resistance to the high temperature environment of the hot gas path. One such surface treatment is a thermal barrier coating. In conventional airfoils, each layer of the thermal barrier coating is generally uniform, e.g., having a constant, uniform thickness, across the aerodynamic surface, both in the span direction (i.e., from the root to the tip) and the in the flow direction (i.e., from the leading edge to the trailing edge). However, the conditions present at various locations around the airfoil may differ, and the properties of the layers in the thermal barrier may also vary. For example, one layer may be more robust to physical impacts, while another layer may provide better temperature resistance.

Accordingly, an airfoil for a turbomachine having a thermal barrier coating that provides robust physical characteristics in selected areas or portions of the airfoil would be useful.

BRIEF DESCRIPTION

Aspects and advantages of the systems in accordance with the present disclosure will be set forth in part in the following description, or may be obvious from the description, or may be learned through practice of the technology.

In accordance with one embodiment, an airfoil for a turbomachine is provided. The airfoil includes a root and a tip spaced radially outward from the root. A span of the airfoil is defined between the root and the tip. The airfoil also includes a leading edge extending across the span of the airfoil from the root to the tip and a trailing edge downstream of the leading edge along a flow direction. The trailing edge also extends across the span of the airfoil from the root to the tip. The airfoil further includes a pressure side surface extending between the root and the tip and extending between the leading edge and the trailing edge and a suction side surface extending between the root and the tip and extending between the leading edge and the trailing edge. The suction side surface opposes the pressure side surface. The airfoil also includes a thermal barrier coating on the pressure side surface and the suction side surface. The thermal barrier coating includes a base layer and a top coat. A thickness of the base layer varies across each of the pressure side surface and the suction side surface with a maximum thickness of the base layer at the leading edge.

In accordance with another embodiment, a turbomachine is provided. The turbomachine includes a compressor, a combustor disposed downstream from the compressor, and a turbine disposed downstream from the combustor. The turbine includes a rotor blade and a stator vane. At least one of the rotor blade and the stator vane includes an airfoil. The airfoil includes a root and a tip spaced radially outward from the root. A span of the airfoil is defined between the root and the tip. The airfoil also includes a leading edge extending across the span of the airfoil from the root to the tip and a trailing edge downstream of the leading edge along a flow direction. The trailing edge also extends across the span of the airfoil from the root to the tip. The airfoil further includes a pressure side surface extending between the root and the tip and extending between the leading edge and the trailing edge and a suction side surface extending between the root and the tip and extending between the leading edge and the trailing edge. The suction side surface opposes the pressure side surface. The airfoil also includes a thermal barrier coating on the pressure side surface and the suction side surface. The thermal barrier coating includes a base layer and a top coat. A thickness of the base layer varies across each of the pressure side surface and the suction side surface with a maximum thickness of the base layer at the leading edge.

These and other features, aspects, and advantages of the present systems will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present systems, including the best mode of making and using the present systems and methods, directed to one of ordinary skill in the art, is set forth in the specification, which makes reference to the appended figures, in which.

Figure 1:
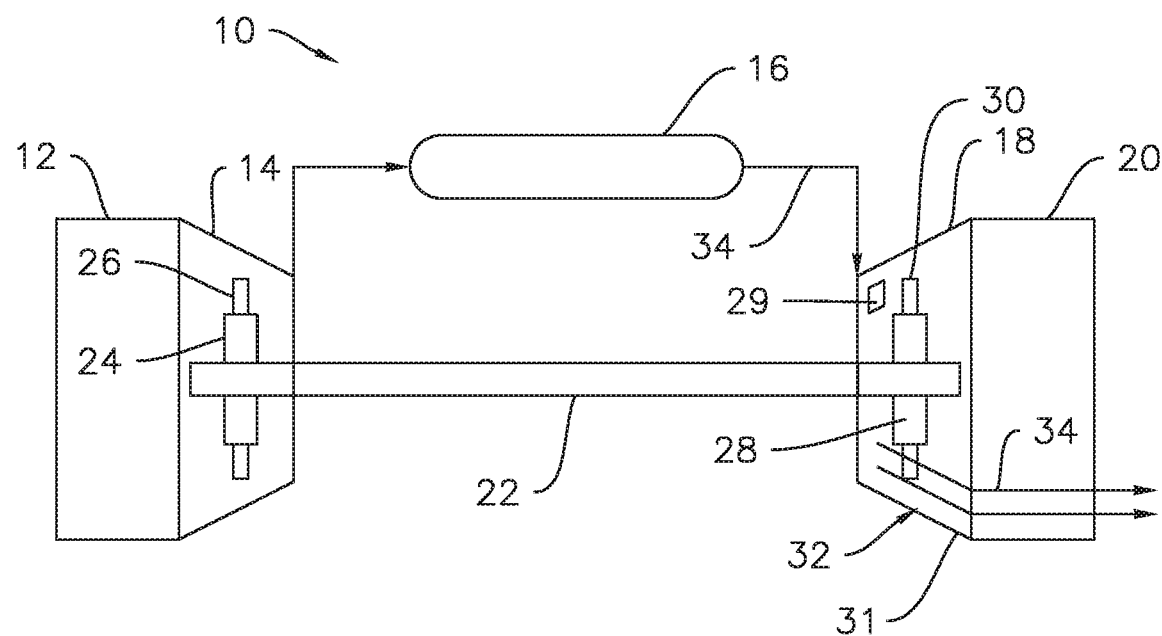
FIG. 1 is a schematic view of a turbomachine, in accordance with embodiments of the present disclosure.

Repeat use of reference characters in the present specification and drawings is intended to represent the same or analogous features or elements of the present technology.

DETAILED DESCRIPTION

Reference will now be made in detail to embodiments of the present systems, one or more examples of which are illustrated in the accompanying drawings. Each example is provided by way of explanation, rather than limitation of, the technology. In fact, it will be apparent to those skilled in the art that various modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the technology. As used herein, the terms "first," "second," and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component; the term "axially" refers to the relative direction that is substantially parallel and/or coaxially aligned to an axial centerline of a particular component; and the term "circumferentially" refers to the relative direction that extends around the axial centerline of a particular component.

Terms of approximation, such as "generally" or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Although an industrial or land-based gas turbine is shown and described herein, the present systems as shown and described herein are not limited to a land-based and/or industrial gas turbine, unless otherwise specified in the claims. For example, the technology as described herein may be used in any type of turbomachine including, but not limited to, a steam turbine, an aircraft gas turbine or a marine gas turbine.

Referring now to the drawings, wherein identical numerals indicate the same elements throughout the figures, FIG. 1 illustrates a schematic diagram of one embodiment of a turbomachine, which in the illustrated embodiment is a gas turbine 10. It should be understood that the gas turbine 10 of the present disclosure need not be a gas turbine engine, but rather may be any suitable turbomachine, such as a steam turbine engine or other suitable engine.

As shown, the gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18. The turbine section may also include a plurality of stator vanes 29, which are mounted to the casing 31 within the hot gas path 32.

During operation, a working fluid such as air flows through the inlet section 12 and into the compressor section 14 where the air is progressively compressed, thus providing pressurized air to the combustors of the combustor section 16. The pressurized air is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
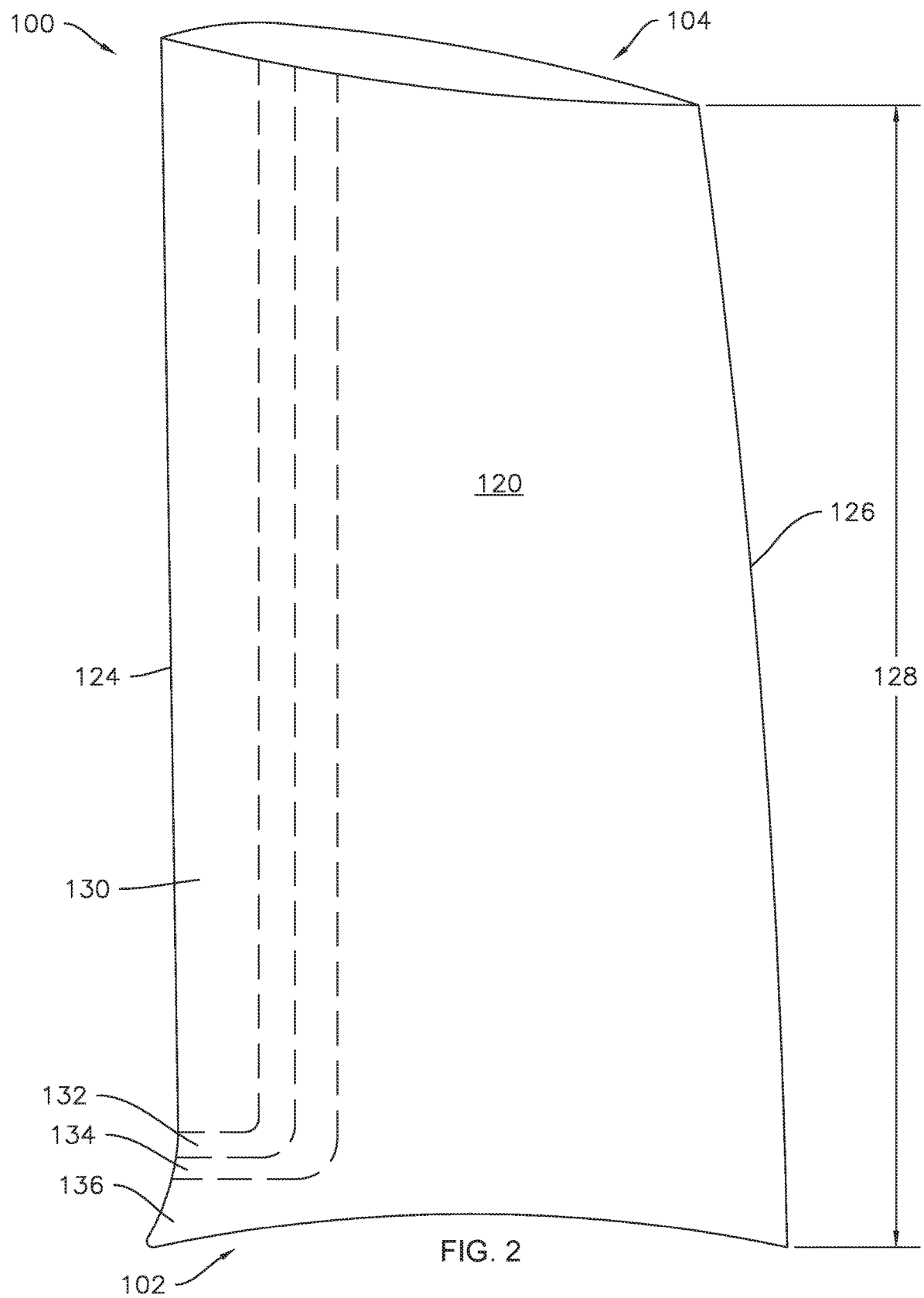
FIG. 2 illustrates a perspective view of an exemplary airfoil, in accordance with embodiments of the present disclosure which may be incorporated into a stator vane or a rotor blade of a turbomachine, such as the gas turbine engine of FIG. 1.
Figure 3:
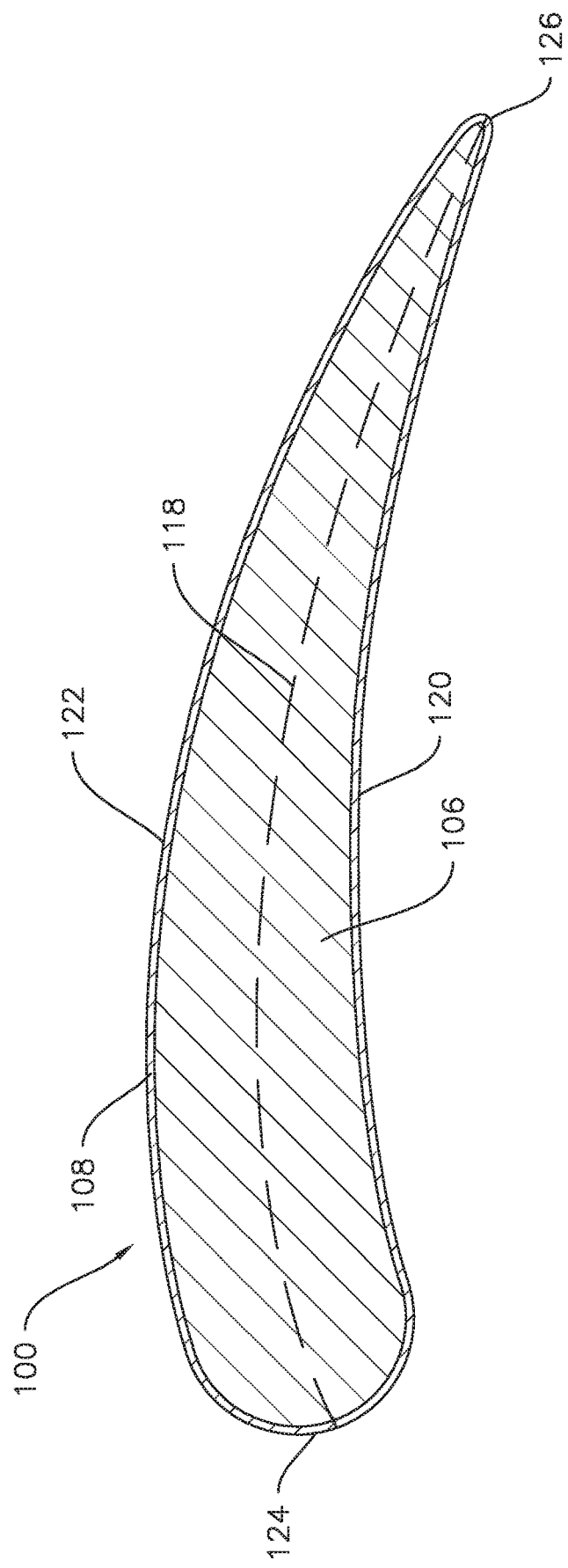
FIG. 3 illustrates a simplified section view of the airfoil of FIG. 2.

FIG. 2 illustrates a perspective view of an exemplary airfoil 100, which may be incorporated into the rotor blade 30 and/or stator vane 29 of the turbine section 18 of the gas turbine 10. As illustrated in FIG. 2, the airfoil 100 may extend radially outward from a root 102 to a tip 104. The airfoil 100 includes a pressure side surface 120 and an opposing suction side surface 122 (FIG. 3). The pressure side surface 120 and the suction side surface 122 are joined together or interconnected at a leading edge 124 of the airfoil 114, which is oriented into the flow of combustion gases 34 (FIG. 1). The pressure side surface 120 and the suction side surface 122 are also joined together or interconnected at a trailing edge 126 of the airfoil 114 spaced downstream from the leading edge 124. The pressure side surface 120 is generally concave, and the suction side surface 122 is generally convex.

Referring particularly to FIG. 2, the airfoil 100 defines a span 128 extending from the root 102 to the tip 104. In particular, the root 102 is positioned at zero percent (0%) of the span 128, and the tip 104 is positioned at one hundred percent (100%) of the span 128.

FIGS. 3 through 9 provide various cross-sectional views of an exemplary airfoil 100. It should be noted that each of the sectional views in FIGS. 3 through 9 is a constant-span section. For example, FIG. 3 may be taken at about fifty percent (50%) of the span 128, and the entirety of the section through the airfoil 100 as shown in FIG. 3 lies at the same position along the span 128, e.g., at about fifty percent (50%) of the span 128.

As may be seen, e.g., in FIG. 3, the airfoil 100 defines a camber line 118. More specifically, the camber line 118 extends from the leading edge 124 to the trailing edge 126. The camber line 118 is also positioned between and equidistant from the pressure side surface 120 and the suction side surface 122. Also, as may generally be seen in FIG. 3, a thermal barrier coating 108 may be provided on the outermost surface of the airfoil 100. For example, as illustrated in FIG. 3, the thermal barrier coating 108 may be provided on each of the pressure side surface 120 and the suction side surface 122.

Figure 4:
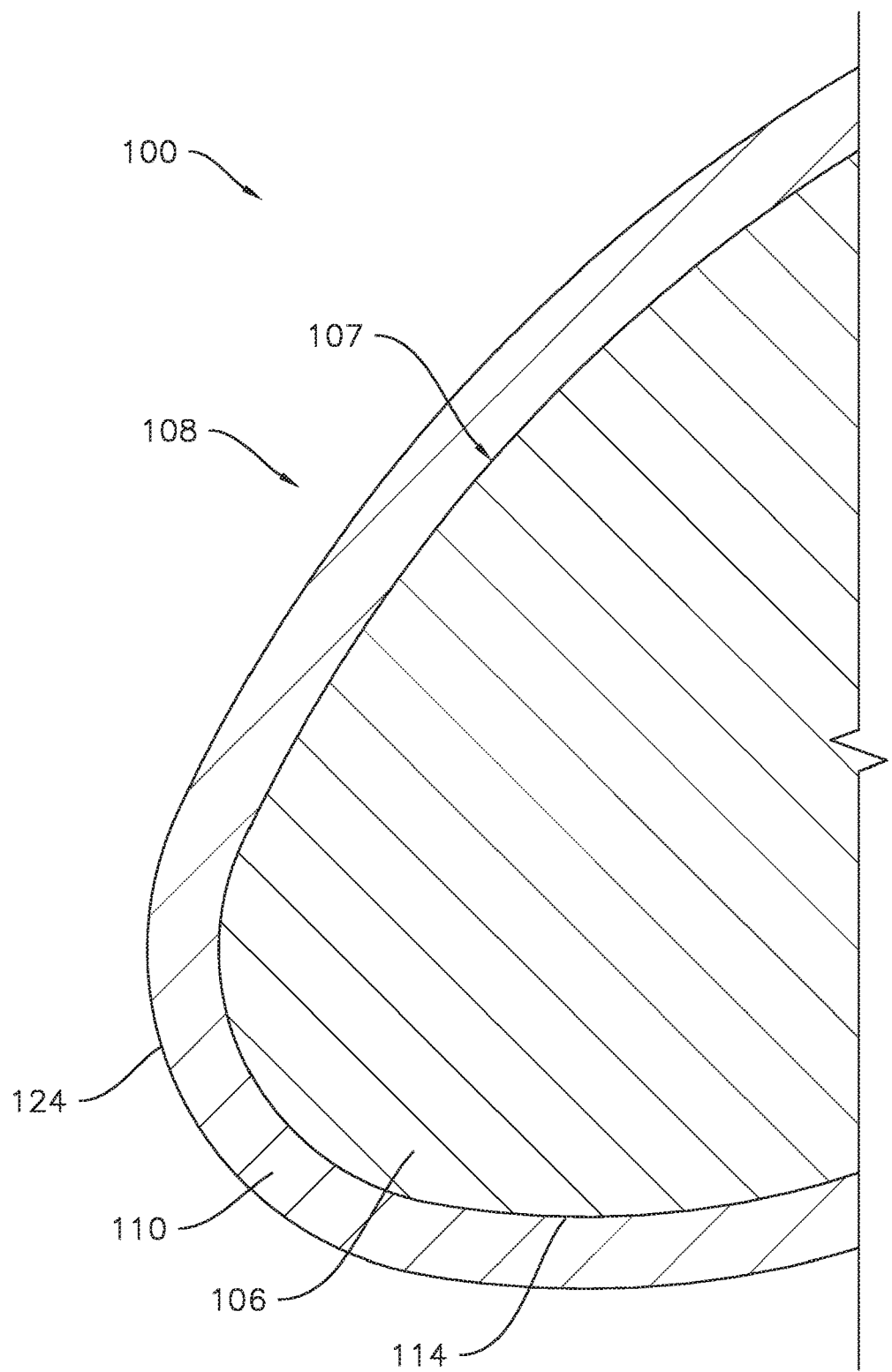
FIG. 4 illustrates an enlarged view of a leading portion of the airfoil shown in FIG. 3.
Figure 5:
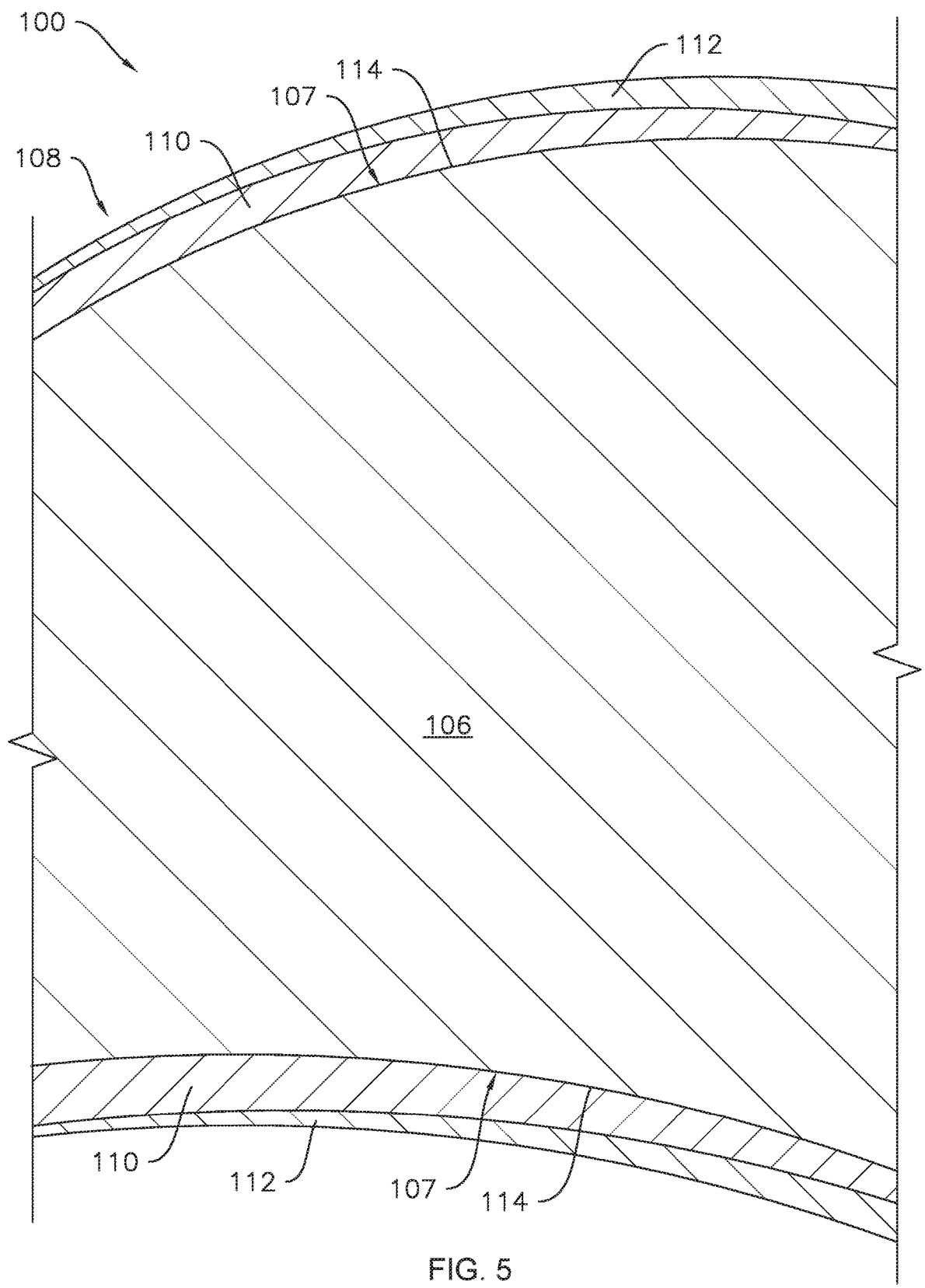
FIG. 5 illustrates an enlarged view of a first intermediate portion of the airfoil shown in FIG. 3.
Figure 6:
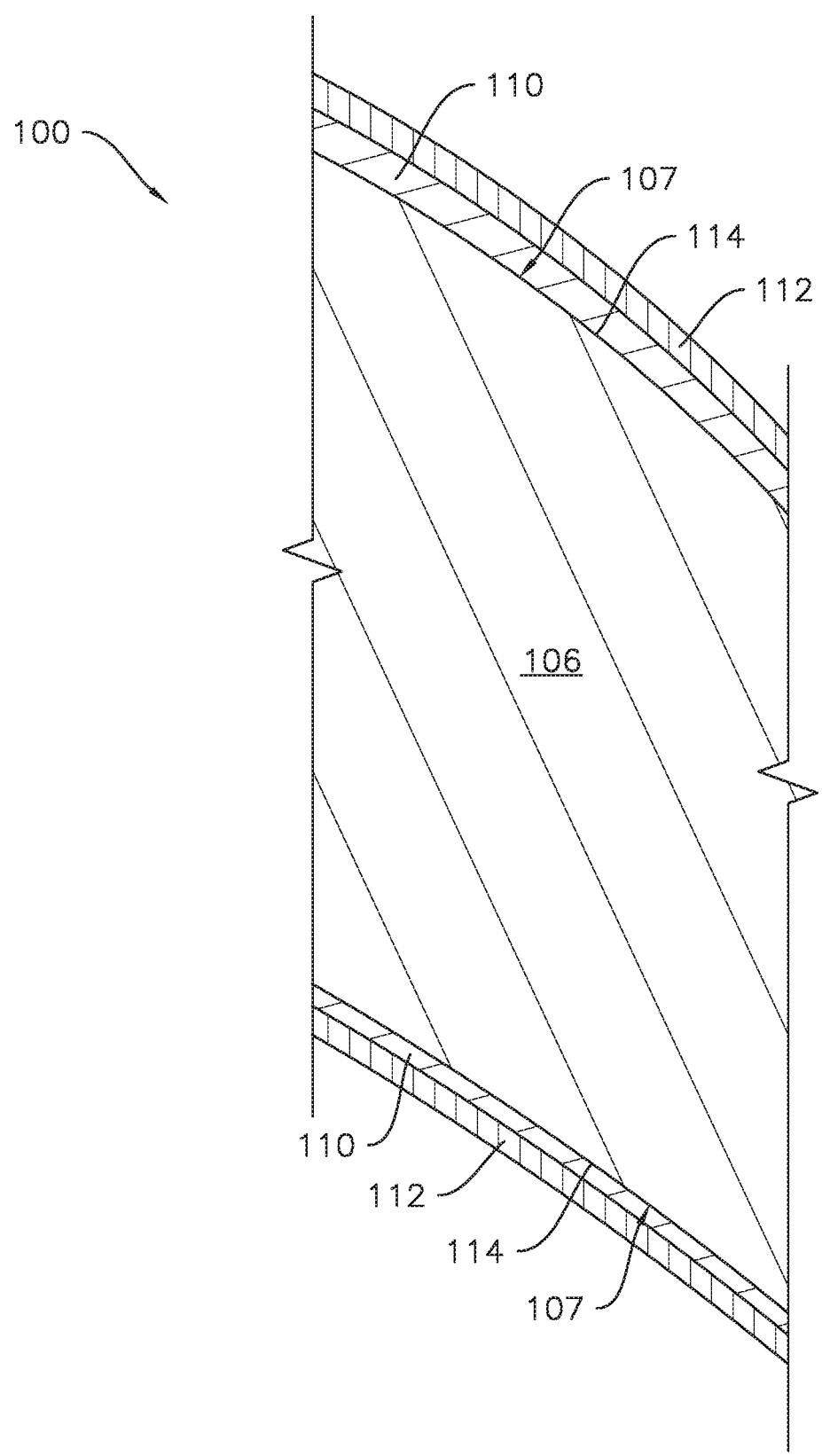
FIG. 6 illustrates an enlarged view of a second intermediate portion of the airfoil shown in FIG. 3.
Figure 7:
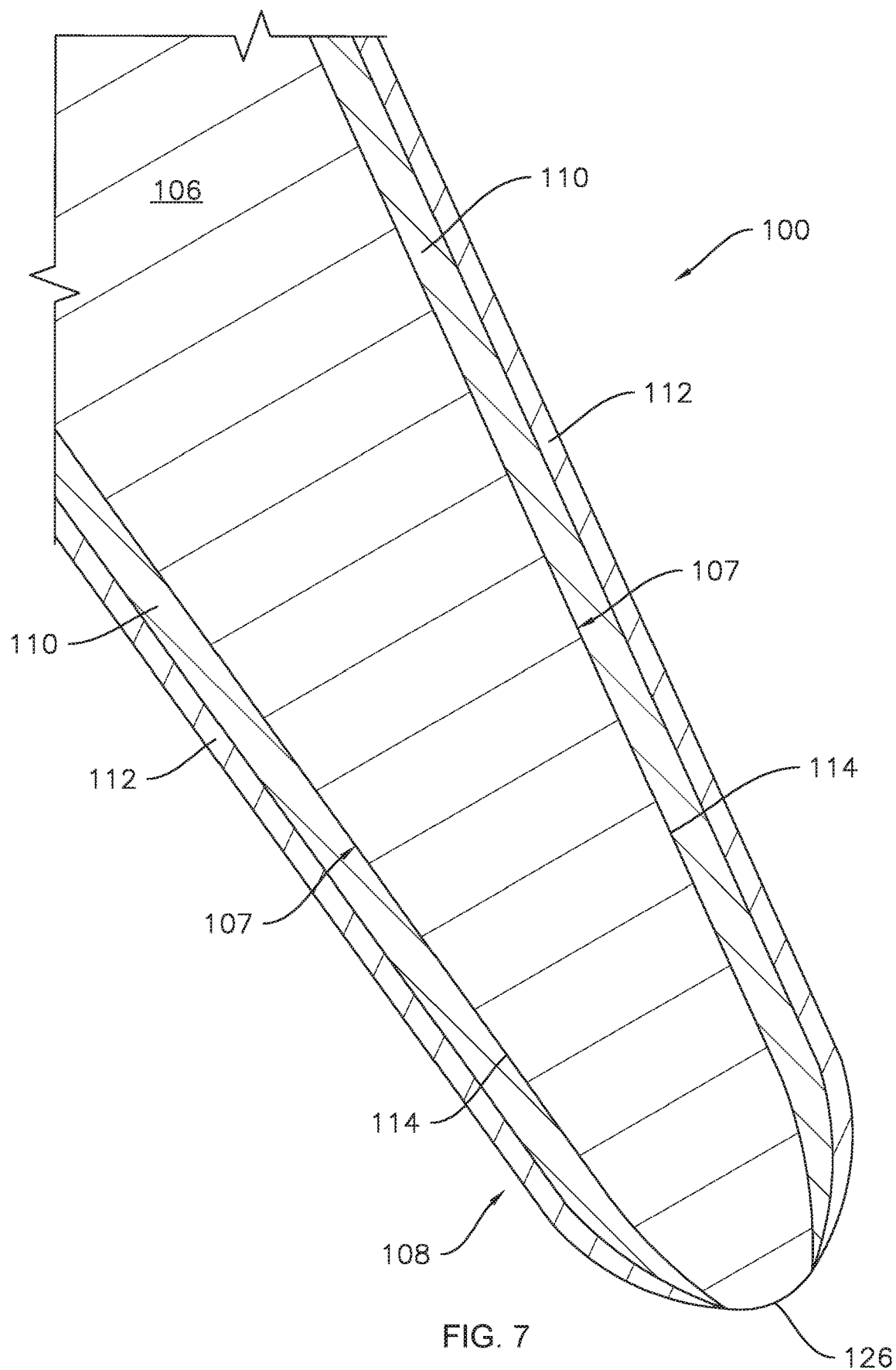
FIG. 7 illustrates an enlarged view of a trailing portion of the airfoil shown in FIG. 3, according to one or more embodiments of the present disclosure.
Figure 8:
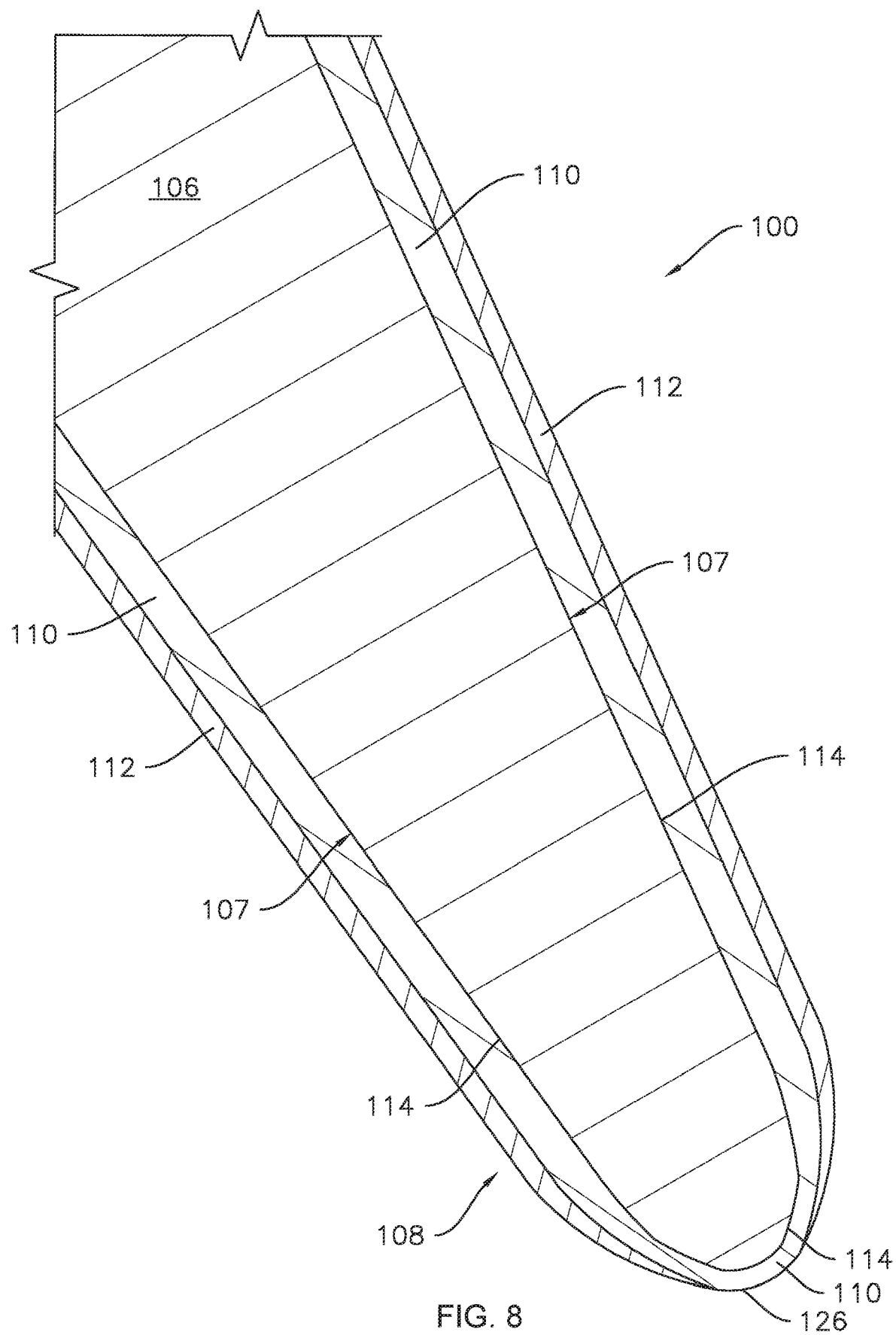
FIG. 8 illustrates an enlarged view of the trailing portion of the airfoil shown in FIG. 3, according to one or more additional embodiments of the present disclosure.
Figure 9:
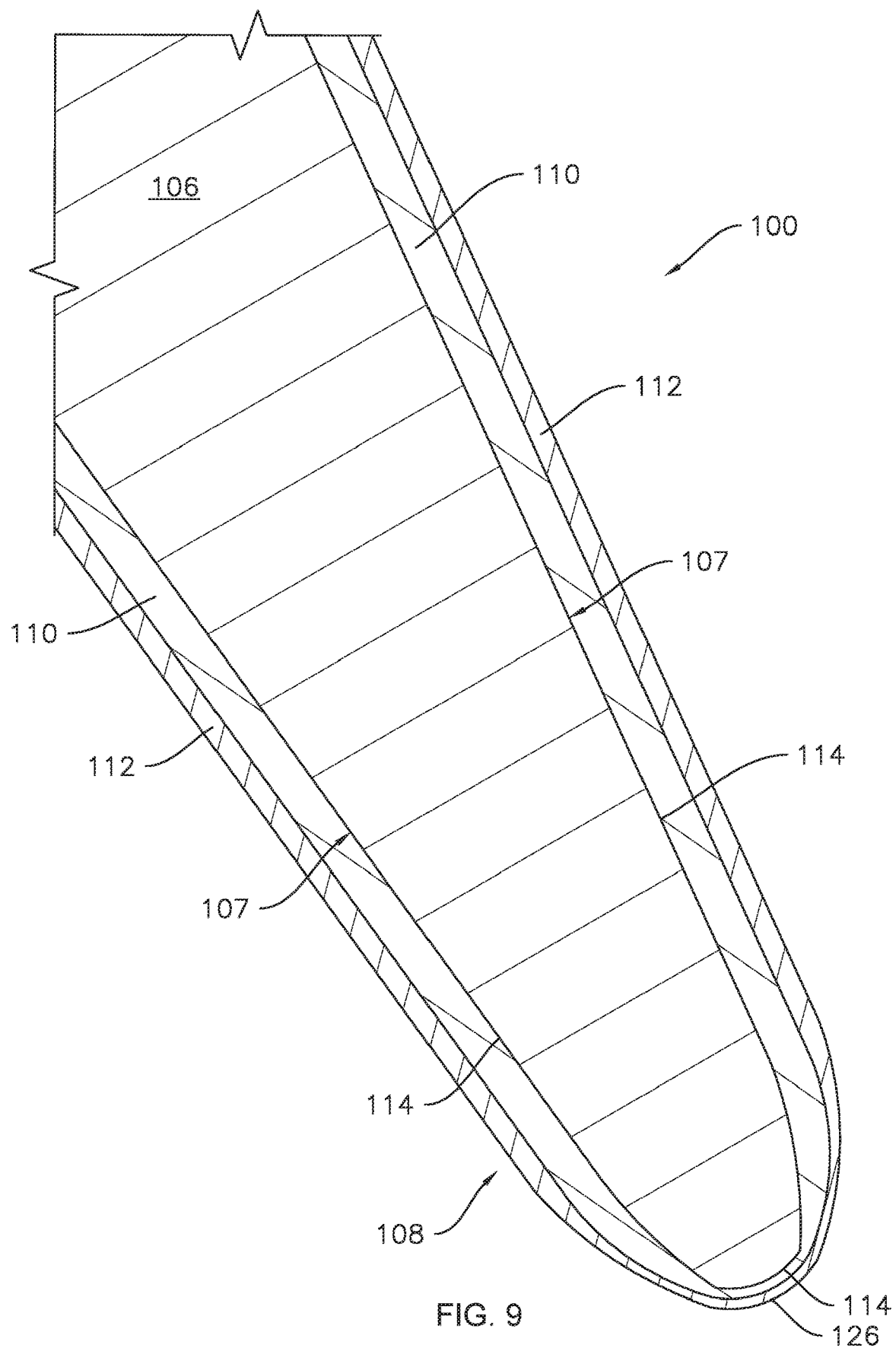
FIG. 9 illustrates an enlarged view of the trailing portion of the airfoil shown in FIG. 3, according to one or more further embodiments of the present disclosure.

FIG. 4 provides an enlarged view of a leading edge portion of the airfoil 100, e.g., a portion of the airfoil 100 including the leading edge 124 and parts of the airfoil 100 proximate thereto. FIG. 5 provides an enlarged view of a mid-forward portion of the airfoil 100, e.g., a portion of the airfoil 100 that is aft of the leading edge 124 and forward of a midpoint of the airfoil 100, the midpoint being defined along the direction of flow of combustion gases. FIG. 6 provides an enlarged view of a mid-aft portion of the airfoil 100, e.g., a portion of the airfoil 100 that is aft of the midpoint of the airfoil 100 and forward of the trailing edge 126. FIG. 7 provides an enlarged view of a trailing edge portion of the airfoil 100, e.g., a portion of the airfoil 100 including the trailing edge 126 and parts of the airfoil 100 proximate thereto, according to one or more embodiments. FIGS. 8 and 9 provide further views of the trailing edge portion of the airfoil according to one or more additional embodiments.

As may be seen in FIGS. 3 through 9, the base or core material of the airfoil 100 may comprise a substrate 106 onto which the thermal barrier coating 108 is applied. For example, the substrate 106 may be or include a metallic material, such as an alloy including iron and nickel or cobalt, e.g., high-temperature steel, superalloys, and/or other suitable metal alloys. The thermal barrier coating 108 may include, for example, ceramic material. The thermal barrier coating 108 is generally formed on an exterior surface 107 of the substrate 106. In various embodiments, the airfoil 100 may include the thermal barrier coating 108 directly on the exterior surface 107 or may include a bond coat 114 formed directly on the exterior surface 107 of the substrate 106. In embodiments wherein the bond coat 114 is provided, the thermal barrier coating 108 may be formed directly on the bond coat 114.

As may be seen in FIGS. 4 through 9, the thermal barrier coating 108 may include a plurality of layers. For example, the thermal barrier coating 108 may include a base layer 110 closer to the substrate 106 and a top coat 112 outward and/or on top of the base layer 110.

The thickness of the base layer 110 may vary across each of the pressure side surface 120 and the suction side surface 122. For example, the thickness of the base layer 110 may decrease across each of the pressure side surface 120 and the suction side surface 122. In at least some embodiments, the thickness of the base layer 110 may decrease from a maximum at the leading edge 124 to a minimum at the trailing edge 126. Providing a maximum thickness of the base layer 110 at and around the leading edge 124 may advantageously provide improved physical resistance at the leading edge portion of the airfoil 100, which may be advantageous when the leading edge portion of the airfoil 100 is more likely than downstream portions of the airfoil 100 to experience a physical impact and/or erosion.

Thus, in various embodiments, the thickness of the base layer 110 at the leading edge 124 may be greater than a thickness of the top coat 112 at the leading edge 124. In some embodiments, the thickness of the base layer 110 may taper continuously from the leading edge 124 to the trailing edge 126 across each of the pressure side surface 120 and the suction side surface 122. In some embodiments, the thickness of the base layer 110 at the trailing edge 126 may be less than the thickness of the top coat 112 at the trailing edge 126.

In some embodiments, the thermal barrier coating 108 may consist of only the base layer 110 at the leading edge 124, e.g., the ratio of base layer 110 to top coat 112 may be 100:0 in the leading edge portion, and there may be no top coat 112 at the leading edge 124. In alternative embodiments, the thermal barrier coating 108 may include mostly base layer 110 at and around the leading edge, such as a ratio of base layer 110 to top coat 112 of about 90:10, such as about 80:20.

In some embodiments, e.g., as illustrated in FIG. 7, no thermal barrier coating 108 may be provided at the trailing edge 126. For example, in such embodiments, the base coat 110 and the top coat 112 may both taper down to zero thickness at or proximate to the trailing edge 126, as illustrated in FIG. 7.

In other embodiments, the thermal barrier coating 108 may continue across the trailing edge 126. For example, in some embodiments, the proportion of the layers of the thermal barrier coating 108 at the trailing edge 126 may be the same as or similar to the proportion at the leading edge 124 (e.g., as illustrated in FIG. 4). In such embodiments, e.g., as illustrated in FIG. 8, the top coat 112 may taper down in thickness at or approaching the trailing edge 126, such that the ratio of base layer 110 to top coat 112 may be 100:0 in the trailing edge portion, and there may be no top coat 112 at the trailing edge 126. Additionally, and similar to the leading edge 124 as described above, the thermal barrier coating 108 may include mostly base layer 110 at and around the trailing edge 126, such as a ratio of base layer 110 to top coat 112 of about 90:10, such as about 80:20.

In some embodiments, e.g., as illustrated in FIG. 9, both layers of the thermal barrier coating 108, e.g., the base layer 110 and the top coat 112, may wrap around the trailing edge 126 with a generally constant thickness around the trailing edge 126.

Referring again to FIG. 2, in some embodiments, the leading edge portion and/or the area or portion of the airfoil 100 where the base layer 110 thickness is at a maximum may encompass a high-impact zone 130 on the airfoil 100. It should be noted that the high-impact zone 130 refers to a relatively high probability of physical impact and/or erosion within the delineated area 130 relative to the remainder of the airfoil 100, in particular, the remainder of the aerodynamic surfaces 120 and 122 thereof. Additionally, it should be understood that the high-impact zone 130 is generally symmetrical about the leading edge 124 and extends over about the same distance along the length of the airfoil 100 on both the pressure side 120 (as shown in FIG. 2) and the suction side 122.

As noted above, the length of the airfoil 100 is defined along the flow direction. In at least some embodiments, the leading edge portion may be coextensive with the high-impact zone 130, e.g., the maximum thickness of the base layer 110 may be provided at the leading edge 124 and throughout the high-impact zone 130. Moving from the leading edge 124 to the trailing edge 126, the thickness of the base layer 110 may be at a maximum in the area 130, may decrease in the first intermediate zone 132, and may decrease again in the second intermediate zone 134. As a result, the thickness of the base layer 110 may be less in the second intermediate zone 134 than in the first intermediate zone 132. Also, the thickness of the base layer 110 may decrease again in a downstream or aft zone 136. In some embodiments, the thickness of the base layer 110 may be at a minimum at the trailing edge 126 and/or within the area of the aft zone, as indicated by 136 in FIG. 2.

In some embodiments, the minimum thickness of the base layer 110 may account for about seventy percent (70%) of the total thermal barrier coating 108 or less, such as about sixty percent (60%) or less, such as about fifty percent (50%) or less, such as about forty percent (40%) or less, or such as about thirty percent (30%) or less.

Still with reference to FIG. 2, in some embodiments, the thickness of the base layer 110 may also vary across the span 128 of the airfoil 100. For example, the ratio of the base layer 110 and top coat 112 within the thermal barrier coating 108 may be at the base ratio, e.g., minimum thickness of the base layer 110, across the full length of the airfoil 100 at the root 102 and the thickness of the base layer 110 may increase at about ten percent (10%) to about twenty percent (20%) of the span 128. That is, the thermal barrier coating 108 may transition from the minimum thickness of the base layer 110 in the aft zone 136 to one of the intermediate zones 134 or 132 at about five percent (5%) of the span 128 or greater, such as at about ten percent (10%) of the span 128, such as at about twenty percent (20%) of the span 128, such as at about thirty percent (30%) of the span 128, and/or within a zone extending from about five percent (5%) to about thirty percent (30%) of the span 128. In various embodiments, there may be a second spanwise increase in the thickness of the base layer 110, e.g., a transition from the second intermediate zone 134 to the first intermediate zone 132, which may occur at about ten percent (10%) of the span 128 or greater, such as at about twenty percent (20%) of the span 128, such as at about thirty percent (30%) of the span 128, such as about forty percent (40%) of the span 128, and/or within a zone extending from about ten percent (10%) of the span 128 to about forty percent (40%) of the span 128.

In some embodiments, the thickness of the base layer 110 at the leading edge 124 may vary across the span 128 of the airfoil 100, while also being constant across the span 128 at other portions of the airfoil 100, such as at the trailing edge 126. In such embodiments, the maximum thickness of the base layer 110 may be defined at the leading edge 124, and in particular at about a mid-span point (e.g., about fifty percent span) on the leading edge 124. For example, the maximum thickness of the base layer 110 may be provided from about forty percent of the span 128 outward, e.g., starting at forty percent span and continuing to one hundred percent span, such as from about fifty percent span outward, or such as from about sixty percent span outward.

Moreover, it should be understood that additional embodiments may include more or fewer transitions in one or both of the span direction and the flow direction, e.g., along the length of the airfoil 100. For example, some embodiments may include only one intermediate zone, or three intermediate zones, four intermediate zones, or more. The transition or transitions in thickness of the base layer 110 are generally gradual and tapering such that the lines indicating the various zones in FIG. 2 are to be understood as for illustrative purposes only and not as sharp boundaries between areas of varying thicknesses of the base layer 110. Additionally, some embodiments may include a continuous variation of the thickness of the base layer 110, such that there are effectively infinite or constant transitions in the thickness of the base layer 110. For example, when the thermal barrier coating 108 is continuous around the airfoil 100, e.g., as illustrated in FIG. 3, the varying thickness of the base layer 110 may thus form an effectively infinite loop around the perimeter of the airfoil 100.

In at least some embodiments, the total thickness of the thermal barrier coating 108 may be the same across a majority of the airfoil 100, such as at least from the leading edge 124 to at least about seventy-five percent (75%) of the length of the airfoil 100, e.g., where the length of the airfoil 100 is defined along the flow direction. For example, the overall thickness of the thermal barrier coating 108 may be constant over at least about eighty-five percent (85%) of the length of the airfoil 100, such as at least about ninety percent (90%) of the length of the airfoil 100, such as at least about ninety five percent (95%) of the length of the airfoil 100, such as about ninety eight percent (98%) of the length of the airfoil 100 or more. In some embodiments, the total thickness of the thermal barrier coating 108 may be constant over the entire length of the airfoil 100 from the leading edge 124 to the trailing edge 126. Providing a uniform, constant overall thickness to the thermal barrier coating 108 across all or most of the length of the airfoil 100 may advantageously improve the balance, e.g., mass distribution, of the airfoil 100, while also allowing improved resistance to physical impacts and/or erosion at the leading edge 124 and/or leading edge portion with the relatively thicker base layer 110, as described above.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims, if they include structural elements that do not differ from the literal language of the claims, or if they include equivalent structural elements with insubstantial differences from the literal language of the claims.

What is claimed is:
1. An airfoil for a turbomachine, the airfoil comprising:
a root;

a tip spaced radially from the root, the root and the tip defining a span of the airfoil therebetween;

a leading edge extending across the span of the airfoil from the root to the tip;

a trailing edge downstream of the leading edge along a flow direction, the trailing edge extending across the span of the airfoil from the root to the tip;

a pressure side surface extending between the root and the tip and extending between the leading edge and the trailing edge;

a suction side surface extending between the root and the tip and extending between the leading edge and the trailing edge, the suction side surface opposing the pressure side surface; and a thermal barrier coating on the pressure side surface and the suction side surface, the thermal barrier coating comprising a base layer and a top coat on top of at least a portion of the base layer, wherein a thickness of the base layer decreases by constant transitions in the thickness from the leading edge to the trailing edge across each of the pressure side surface and the suction side surface with a maximum thickness of the base layer at the leading edge, and wherein a thickness of the top coat increases from the leading edge towards the trailing edge across each of the pressure side surface and the suction side surface.

2. The airfoil of claim 1, wherein the thickness of the base layer at the leading edge is greater than the thickness of the top coat at the leading edge.

3. The airfoil of claim 1, wherein the thickness of the base layer proximate to the trailing edge is less than the thickness of the top coat proximate to the trailing edge.

4. The airfoil of claim 1, wherein a total thickness of the thermal barrier coating is constant along a direction from the leading edge to the trailing edge across a majority of the airfoil on each of the pressure side surface and the suction side surface.

5. The airfoil of claim 1, wherein the thickness of the base layer varies across the span of the airfoil.

6. The airfoil of claim 1, further comprising a substrate, wherein the thermal barrier coating is formed on an exterior surface of the substrate.

7. The airfoil of claim 6, further comprising a bond coat formed directly on the exterior surface of the substrate, wherein the thermal barrier coating is formed directly on the bond coat.

8. The airfoil of claim 6, wherein the substrate comprises a metallic material and the thermal barrier coating comprises a ceramic material.

9. A turbomachine comprising;

a compressor;

a combustor disposed downstream from the compressor; and a turbine disposed downstream from the combustor, the turbine comprising a rotor blade and a stator vane, at least one of the rotor blade and the stator vane comprising an airfoil, the airfoil comprising:

a root;

a tip spaced radially from the root, the root and the tip defining a span of the airfoil therebetween;

a leading edge extending across the span of the airfoil from the root to the tip;

a trailing edge downstream of the leading edge along a flow direction, the trailing edge extending across the span of the airfoil from the root to the tip;

a pressure side surface extending between the root and the tip and extending between the leading edge and the trailing edge;

a suction side surface extending between the root and the tip and extending between the leading edge and the trailing edge, the suction side surface opposing the pressure side surface; and a thermal barrier coating on the pressure side surface and the suction side surface, the thermal barrier coating comprising a base layer and a top coat on top of at least a portion of the base layer, wherein a thickness of the base layer decreases by constant transitions in the thickness from the leading edge to the trailing edge across each of the pressure side surface and the suction side surface with a maximum thickness of the base layer at the leading edge, and wherein a thickness of the top coat increases from the leading edge towards the trailing edge across each of the pressure side surface and the suction side surface.

10. The turbomachine of claim 9, wherein the thickness of the base layer at the leading edge is greater than the thickness of the top coat at the leading edge.

11. The turbomachine of claim 9, wherein the thickness of the base layer proximate to the trailing edge is less than the thickness of the top coat proximate to the trailing edge.

12. The turbomachine of claim 9, wherein a total thickness of the thermal barrier coating is constant along a direction from the leading edge to the trailing edge across a majority of the airfoil on each of the pressure side surface and the suction side surface.

13. The turbomachine of claim 9, wherein the thickness of the base layer varies across the span of the airfoil.

14. The turbomachine of claim 9, further comprising a substrate, wherein the thermal barrier coating is formed on an exterior surface of the substrate.

15. The turbomachine of claim 14, further comprising a bond coat formed directly on the exterior surface of the substrate, wherein the thermal barrier coating is formed directly on the bond coat.

16. The turbomachine of claim 14, wherein the substrate comprises a metallic material and the thermal barrier coating comprises a ceramic material.

\* \* \* \* \*